(12) United States Patent
Eve

(10) Patent No.: US 9,278,325 B2
(45) Date of Patent: Mar. 8, 2016

(54) METHODS AND SYSTEMS FOR REMOVING DIAMOND-DIAMOND BONDING CATALYSTS FROM POLYCRYSTALLINE DIAMOND

(71) Applicant: Eve Bit Sales, Inc., Hinton, OK (US)

(72) Inventor: Jonathan Eve, Edmond, OK (US)

( * ) Notice: Subject to any disclaimer, the term of this patent is extended or adjusted under 35 U.S.C. 154(b) by 0 days.

(21) Appl. No.: 13/975,889

(22) Filed: Aug. 26, 2013

(65) Prior Publication Data
US 2013/0340352 A1  Dec. 26, 2013

(51) Int. Cl.
| | |
|---|---|
| *B24D 11/00* | (2006.01) |
| *B24D 3/02* | (2006.01) |
| *E21B 10/36* | (2006.01) |
| *B01J 3/06* | (2006.01) |
| *E21B 10/567* | (2006.01) |
| *B01J 19/24* | (2006.01) |
| *B01J 19/28* | (2006.01) |
| *B01J 4/00* | (2006.01) |

(52) U.S. Cl.
CPC .. *B01J 3/06* (2013.01); *B01J 4/002* (2013.01); *B01J 19/24* (2013.01); *B01J 19/28* (2013.01); *E21B 10/567* (2013.01)

(58) Field of Classification Search
CPC .................................. B24D 3/00; C09C 1/68
USPC ........... 422/261–262, 292; 134/6, 93; 51/293, 51/307; 175/433–434
See application file for complete search history.

(56) References Cited

U.S. PATENT DOCUMENTS

| | | | |
|---|---|---|---|
| 8,002,859 B2 * | 8/2011 | Griffo et al. .................... 51/307 |
| 8,377,157 B1 | 2/2013 | Dadson | |
| 8,404,019 B2 | 3/2013 | Ladi et al. | |
| 2004/0226753 A1 | 11/2004 | Villareal | |

OTHER PUBLICATIONS

United States Patent and Trademark Office Acting As the International Searching Authority, "International Search Report and Written Opinion," mailed Mar. 27, 2015 in International patent application No. PCT/US2014/048152.

* cited by examiner

*Primary Examiner* — Monzer R Chorbaji
(74) *Attorney, Agent, or Firm* — Durham Jones & Pineger, P.C. Intellectual Property Law Group

(57) ABSTRACT

Methods for removing, or leaching, cobalt or other diamond-diamond bonding catalysts from polycrystalline diamond compacts (PDCs) or other structures formed from polycrystalline diamond include leaching under conditions that simulate use of PDCs in a hot hole drilling environment. A leaching agent may be formulated, when used under appropriate conditions, to remove or substantially remove cobalt or another catalyst from polycrystalline diamond without dissolving, degrading or otherwise attacking a substrate that supports or carries the polycrystalline diamond. The leaching agent may include one or more components that mimick the chemicals or conditions to which a PDC would be exposed in a hot hole drilling environment. Polycrystalline diamond structures from which cobalt or another diamond-diamond bonding catalyst has been removed or substantially removed are also disclosed, as are systems for leaching cobalt or other diamond-diamond bonding catalysts from polycrystalline diamond.

19 Claims, 1 Drawing Sheet

METHODS AND SYSTEMS FOR REMOVING DIAMOND-DIAMOND BONDING CATALYSTS FROM POLYCRYSTALLINE DIAMOND

TECHNICAL FIELD

This disclosure relates generally to methods and systems for removing, or leaching, cobalt or other diamond-diamond bonding catalysts from polycrystalline diamond compacts (PDCs) or other structures formed from polycrystalline diamond and, more specifically, to methods and systems in which conditions present in a so-called "hot hole" drilling environment, or a high-pressure, high-temperature (HPHT) environment, may be simulated to leach cobalt or other diamond-diamond bonding catalysts from PDCs and other polycrystalline diamond structures. Leaching agents are also disclosed. This disclosure also relates to PDCs and other polycrystalline diamond structures from which cobalt or another diamond-diamond bonding catalyst has been removed or substantially removed.

RELATED ART

Polycrystalline diamond is typically formed using a process known as "sintering" under extremely high temperatures and pressures. A catalyst, often cobalt, is typically used to facilitate the formation of diamond-diamond bonds during the sintering process. While diamond is very stable at extremely high temperatures (e.g., 900° C. or greater under atmospheric pressure; 1,400° C. or greater in a vacuum or inert gas; etc.), polycrystalline diamond is not.

It is well known to those in the oil and gas industry that the performance of the PDC on cutting elements of rotary type, earth boring drill bits declines once the PDCs are heated to a temperature of about 750° C., even though PDCs are often exposed to much higher temperatures during drilling (particularly at the depths that are currently being explored). The cobalt catalyst is the primary culprit for the lack of stability.

In response, a variety of processes have been developed to remove cobalt from PDCs. Such processes typically involve chemically leaching the cobalt from the PDC. The result of cobalt leaching is a so-called "thermally stable product," or "TSP," which can withstand much higher temperatures. The depths to which cobalt can be removed from a PDC by state-of-the-art leaching processes is limited, however, because the chemicals that are currently used in leaching processes will dissolve, degrade or otherwise attack the substrates (e.g., a cemented carbide, such as tungsten carbide, etc.) that carry the PDCs of the cutting elements. Thus, cobalt, and its potential for damaging the PDC during use, remain within the interior of the PDC.

SUMMARY

In one aspect, methods for removing, or leaching, cobalt from polycrystalline diamond or a structure formed from polycrystalline diamond, such as a PDC, are disclosed. Much of the ensuing disclosure focuses on the removal of cobalt from PDCs; regardless, it should be understood that the disclosed teachings are generally applicable to removal of cobalt, as well as other catalysts that facilitate the formation of diamond-diamond bonds in polycrystalline diamond, from polycrystalline diamond. In various embodiments, such a method includes applying a leaching agent, which may be in the form of a liquid or a slurry, another fluid form or any other suitable form, to the polycrystalline diamond.

The leaching agent may be formulated to facilitate the removal of cobalt from a PDC. The leaching agent may include one or more oxidizing agents. It may be slightly acidic or slightly basic. In some embodiments, the leaching agent may be formulated to resemble or simulate fluid present in a hot hole drilling, or HPHT, environment, or at least to simulate the content of any oxidizing agents, acids, bases, etc., present in fluid within the hot hole drilling environment. In some embodiments, the leaching agent may resemble or even comprise drilling fluid, or so-called "mud."

A formulation of the leaching agent may be tailored to facilitate the removal, or leaching, of cobalt from the PDC without substantially dissolving, degrading or otherwise attacking material of a cemented carbide substrate that carries the PDC. In this regard, the leaching agent may substantially lack, or be substantially free of, strong acids, such as so-called hard mineral acids.

The leaching agent may be heated to an above-ambient temperature. In some embodiments, the temperature of the leaching agent may be similar to the temperature of fluid within a hot hole drilling environment (e.g., at least about 300° F. (about 150° C.), at least about 400° F. (about 205° C.), at least about 500° F. (about 260° C.), at least about 400° C., etc.).

Leaching may be conducted at a pressure that exceeds atmospheric pressure. In embodiments where pressure is elevated during leaching, the PDCs and the leaching agent may be exposed to a pressure of about 10,000 psi (about 69 MPa) or greater, a pressure of about 20,000 psi (about 138 MPa) or greater or a pressure of about 35,000 psi (about 241 MPa) or greater. In some embodiments, the pressure at which cobalt is leached from the PDC may resemble a pressure present in a hot hole drilling environment.

Application of the leaching agent to the PDC may be effected in any suitable manner. Without limitation, the leaching agent may be applied to surfaces of the PDC in a manner that causes the leaching agent to flow across, or over, the surfaces. In some embodiments, the PDC may reside within a volume of leaching agent during the leaching process. In such an embodiment, the leaching agent may flow across the surfaces of the PDC as the leaching agent circulates throughout the volume. Alternatively, the PDC may be moved throughout the volume of leaching agent (e.g., in the manner a polycrystalline diamond compact on an earth boring drill bit moves when the earth boring drill bit rotates, or drills, etc.) to cause the leaching agent to move across the surfaces of the PDC.

The leaching process, including the act of applying leaching agent to the surfaces of the PDC, may continue for an extended period of time. The extended period of time may comprise a predetermined period of time. As a non-limiting example, the surfaces of the PDC may be exposed to leaching agent for twenty-four hours or more. Alternatively, the duration of exposure of the PDC to the leaching agent may be determined by monitoring the amount of cobalt removed from the PDC by the leaching agent. Upon determining that a sufficient amount of cobalt has been removed from the polycrystalline diamond compact, an appropriate time for removing the PDC from the leaching agent, or for removing the leaching agent from the PDC, may also be determined.

In a specific embodiment, which may include various combinations of the features disclosed above, the leaching process may simulate aspects of drilling in a hot hole drilling environment.

Leaching in accordance with teachings of this disclosure may accompany or be accompanied by one or more of cleaning, deburring and polishing the PDC.

According to another aspect, a system for removing, or leaching, cobalt from a PDC is disclosed. Such a system includes a leaching agent (such as that disclosed above), a heating element and a hot hole simulator. The heating element may be configured to increase the temperature of the leaching agent to a sufficient temperature to facilitate the leaching of cobalt from the PDC, or even to optimize the rate at which cobalt is leached from the PDC. In some embodiments the heating element may be configured to heat the leaching agent to a temperature present in a hot hole drilling environment (e.g., at least about 300° F. (about 150° C.), etc.). The hot hole simulator may be configured to apply the leaching agent to surfaces of the PDC; for example, in the manner disclosed above.

A system for removing, or leaching, cobalt from a PDC may also include a sensor for monitoring an amount of cobalt that has been removed from the PDC by the leaching agent. Information obtained from such a sensor may be used to determine an appropriate time to remove the PDC from the leaching agent, or an appropriate time to remove the leaching agent from the PDC.

Systems, leaching agents and processes that incorporate teachings of this disclosure may be used to substantially remove cobalt from a polycrystalline diamond structure, such as a PDC. The term "substantially" is used in conjunction with the removal of cobalt or another catalyst from polycrystalline diamond to acknowledge limitations that will be readily apparent to those of ordinary skill in the art on the complete removal of the catalyst from polycrystalline diamond; some of the catalyst may remain at locations of the polycrystalline diamond that are most distant from its surface. The substantial removal of cobalt from the polycrystalline diamond may exceed the depth (i.e., about 200 µm) of current leaching processes and, in some embodiments, may include the substantial removal of cobalt or another diamond-diamond bonding catalyst from the entire volume of the polycrystalline diamond (i.e., trace amounts of the catalyst may remain within the interior of the polycrystalline diamond). Moreover, cobalt may be substantially removed from polycrystalline diamond without substantially dissolving, degrading or otherwise attacking a substrate (e.g., a cemented carbide, such as tungsten carbide; etc.) that carries the polycrystalline diamond.

Other aspects, as well as features and advantages of various aspects, of the disclosed subject matter will become apparent to those of ordinary skill in the art through consideration of the ensuing description, the accompanying drawings and the appended claims.

BRIEF DESCRIPTION OF THE DRAWINGS

In the drawings, FIGS. 1 and 2 provide schematic representations of embodiments of systems for leaching cobalt from polycrystalline diamond compacts.

DETAILED DESCRIPTION

Figure 1:
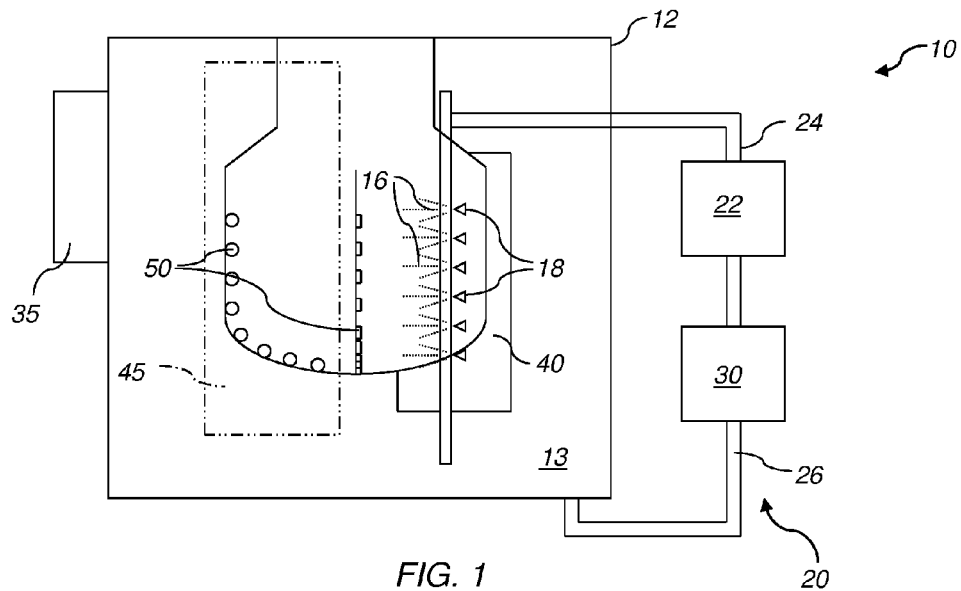
Figure 2:
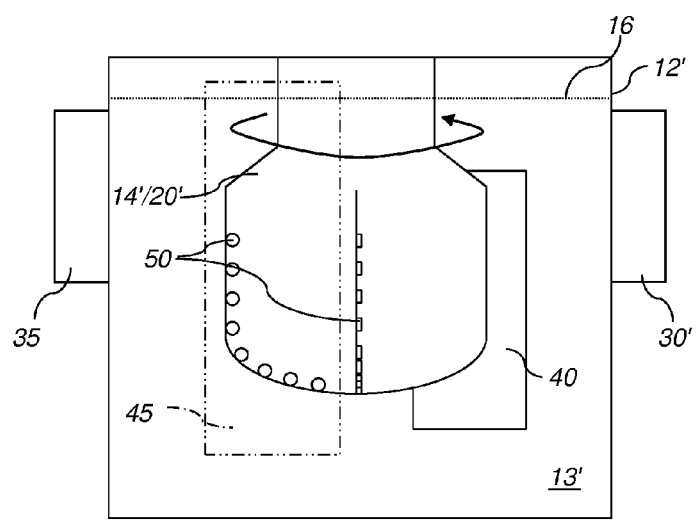

FIGS. 1 and 2 illustrate embodiments of leaching systems 10 and 10', respectively, for removing cobalt from one or more PDCs. A leaching system 10, 10', etc., that incorporates teachings of this disclosure may comprise a hot hole simulator. Each leaching system 10, 10' includes a container 12, 12' that is configured to artificially simulate a hot hole drilling environment. Each container 12, 12' includes an interior 13, 13' configured to receive and hold one or more PDCs 50 (or other structures that include polycrystalline diamond) in a manner that facilitates or enables exposure of each PDC 50 to a leaching agent and/or to leaching conditions.

As shown by FIG. 2, a container 12' may include a support 14' within its interior 13'. The support 14' may be configured to hold one or more PDCs 50 in place during the leaching process. In a specific embodiment, the support 14' may comprise or be configured to at least functionally resemble a bit body (e.g., a bit body of a rotary type, earth boring drag bit, etc.). Such a support 14' may be configured to releasably hold one or more PDCs 50 in orientations that resemble the placement of PDCs on cutting elements that have been secured to a bit body. Optionally, a support 14' may be configured to rotate (e.g., in a manner similar to the rotation of a rotary type, earth boring drag bit during drilling, etc.).

In addition to being configured to hold one or more PDCs 50, the container 12, 12' of some embodiments of a leaching system 10, 10' may be configured to expose the PDC(s) 50 within the interior 13, 13' of the container 12, 12' to a leaching agent 16. In some embodiments, such as that illustrated by FIG. 1, a container 12 may carry one or more nozzles 18 or other orifices that are configured and oriented to direct leaching agent 16 toward the PDC(s) 50 (e.g., in a jet, as a spray, as a curtain, etc.). In other embodiments, such as that depicted by FIG. 2, the container 12, 12' may simply contain the leaching agent 16. In either event, as well as in other embodiments, the leaching system 10, 10' may include a circulation element 20, 20' that causes movement of the leaching agent 16 throughout the interior 13, 13' of the container 12, 12'.

In the embodiment depicted by FIG. 1, the circulation element 20 may be configured to pressurize the leaching agent 16 so as to cause the leaching agent 16 to be ejected through the nozzles 18. Such a circulation element 20 may also be configured to collect leaching agent 16 from the interior 13 of the container 12. In some embodiments, such a circulation element 20 may comprise a pump 22 and one or more conduits 24 and 26 associated with the pump 22 to enable the delivery of leaching agent 16 into and its collection from the interior 13 of the container 12. In addition, such a circulation element may include one or more features (e.g., filters, etc.) that remove waste materials (e.g., the products of the leaching process, etc.) from the leaching agent 16.

Together, the circulation element 20 and the container 12 may comprise parts of a substantially closed system, in which leaching agent 16 is introduced into the interior 13 of the container 12, removed from the interior 13 of the container 12 and promptly recycled. Alternatively, the circulation element 20 may be configured to deliver "fresh" leaching agent 16 into the interior 13 of the container 12, while removing "spent" leaching agent 16 (i.e., leaching agent 16 that includes waste, or the product(s) of the leaching process) for processing and/or disposal.

A circulation element 20 of the type described in reference to FIG. 1 may, in conjunction with a configuration of the container (e.g., its construction, the inclusion of seals, etc.), be configured to provide an elevated pressure within, or pressurize, the interior 13 of the container 12. In some embodiments, such a circulation element 20 and container 12 may be configured to provide for an elevated pressure within the interior 13 of the container 12 that resembles a pressure within a hot hole drilling environment.

In the embodiment illustrated by FIG. 2, the circulation element 20' may cause movement throughout a volume of leaching agent 16 within the interior 13' of the container 12'. In some embodiments, such a circulation element 20' may include one or more mechanical mixers. The same effect (or a similar effect) may be achieved by way of a support 14' that rotates or otherwise moves the PDC(s) 50 within the interior 13' of the container 12'. As another alternative, a circulation element 20 of the type shown in and described with respect to FIG. 1 may circulate a volume of leaching agent 16 within the interior 13' of a container 12'.

A leaching system 10, 10' (or any other embodiment of leaching system) that incorporates teachings of this disclosure also includes a heating element 30, 30'. In embodiments, such as that depicted by FIG. 1, that include a circulation element 20 that introduces leaching agent 16 into the interior 13 of the container 12, the heating element 30 may be associated with the circulation element 20 in a manner that enables heating of the leaching agent 16 before it is introduced into the interior 13 of the container 12. In embodiments, such as that illustrated by FIG. 2, where a container 12' of a leaching system 10' holds a volume of leaching agent 16, the heating element 20' may be associated with the container 12' and configured to heat the volume of leaching agent 16 within the interior 13' of the container 12'.

Optionally, a leaching system 10, 10' (or any other embodiment of leaching system) of this disclosure may include a pressurization element 35. The pressurization element 35 may be configured to apply an elevated pressure (e.g., an above-ambient, or above-atmospheric, pressure; a pressure typically present in a hot hole drilling environment, etc.) to the interior 13 of the container 12.

A leaching system 10, 10' may also include a physical contact element 40. The physical contact element 40, which may be located within the interior 13, 13' of the container 12, 12', may be configured to cause some physical contact with each PDC 50 during or after a leaching process. In various non-limiting embodiments, the physical contact element 40 may comprise an apparatus for directing a particulate or abrasive material toward each PDC 50, an apparatus for directing pressurized fluid onto each PDC 50 (e.g., a circulation element 20 and one or more nozzles 18, as depicted by FIG. 1; etc.), one or more brushes, deburring pads, polishing pads or the like, or combinations of any of the foregoing.

As another option, a leaching system (e.g., leaching system 10, leaching system 10', etc.) may include a sensor 45 for monitoring an amount of cobalt that has been removed from the PDC(s) 50 by the leaching agent 16. Information obtained from such a sensor 45 may be used to determine an appropriate time to remove the PDC(s) 50 from the leaching agent 16 and/or the container 12, or an appropriate time to remove the leaching agent 16 from the PDC(s) 50. In some embodiments, the sensor 45 may comprise a chemical sensor (e.g., spectrometer, a chemical reaction test, etc.) that determines a quantity of cobalt that has leached into the leaching agent 16 from the PDC(s) 50. In other embodiments, the sensor 45 may comprise an instrument (e.g., a spectroscopy instrument, etc.) that enables a determination of an amount of cobalt remaining in the PDC(s) 50.

Since a leaching system according to this disclosure (e.g., leaching system 10 of FIG. 1, leaching system 10' of FIG. 2, etc.) is configured to simulate conditions present in a hot hole drilling environment, the components of such a leaching system that will be exposed to conditions (e.g., temperature, pressure, pH, etc.) resembling those present in such an environment are configured to withstand and operate under hot hole drilling conditions.

As has been indicated, a leaching agent (e.g., leaching agent 16, etc.) may be used, in conjunction with a leaching system (e.g., leaching system 10 (FIG. 1); leaching system 10'; etc.) or otherwise. A leaching agent according to this disclosure may be formulated, when subjected to appropriate conditions (e.g., temperature, pressure, etc.), to leach cobalt from the polycrystalline diamond. Additionally, the leaching agent may be formulated to facilitate the removal, or leaching, or cobalt from the polycrystalline diamond without substantially dissolving, degrading or otherwise attacking a substrate (e.g., a cemented carbide substrate, such as a tungsten carbide substrate, etc.) that carries the polycrystalline diamond.

In some embodiments, a leaching agent may be formulated to resemble or simulate fluid present in a hot hole drilling environment, or at least the content of chemicals (e.g., oxidizing agents, acids, bases, etc., or combinations thereof) present in fluid within the hot hole drilling environment. In some embodiments, the leaching agent may comprise drilling fluid, or "mud," of a type used in a hot hole drilling environment. As another alternative, the leaching agent may include a combination of mud and other chemicals that may be present (naturally or introduced into) a hot hole drilling environment.

A leaching agent may include one or more oxidizing agents. A few non-limiting examples of oxidizing agents that may be used include hydrogen peroxide, chlorine, a halogen compound and sodium perborate (PBS).

A leaching agent may be acidic. In some embodiments, the leaching agent may include a strong acid. In other embodiments, the leaching agent may comprise a weak acid, or it may be slightly acidic. As an example, and not by way of limitation, a leaching agent 16 may include citric acid.

The leaching agent may lack a hard mineral acid or substantially lack a hard mineral acid (e.g., include only trace amounts of the hard mineral acid, etc.). The absence or substantial absence of a hard mineral acid may enable the leaching agent to remove cobalt from polycrystalline diamond without dissolving, degrading or otherwise attacking a substrate (e.g., a cemented carbide, etc.) of the PDC(s).

In some embodiments, a leaching agent 16 may include a weak base, or it may be slightly basic.

A leaching agent may also include any of a variety of other components. Without limitation, a leaching agent may include one or more abrasive agents. The abrasive agent(s) of such a leaching agent may resemble the cuttings that are formed and present in a wellbore as a drill bit is used to cut into a formation. As an alternative, or in addition, the abrasive agent(s) may comprise fine gravel and/or sand.

In a method for leaching, or removing, cobalt or another diamond-diamond bonding catalyst from polycrystalline diamond (e.g., of a PDC, of another structure, etc.), a suitable leaching agent (e.g., a leaching agent that incorporates one or more of the above-disclosed teachings, any other suitable leaching agent, etc.) may be applied to the polycrystalline diamond under conditions resembling those present during drilling in hot hole drilling environments.

With renewed reference to FIGS. 1 and 2, such a method may include causing a leaching agent 16 to flow over surfaces of the PDC(s) 50. Referencing FIG. 2, leaching agent 16 may flow across surfaces of the PDC(s) 50 by causing movement (e.g., circulation, oscillation, vibration (e.g., by application of ultrasound, etc.), etc.) in a volume of the leaching agent 16 within which the PDC(s) 50 is (are) disposed. Optionally, the PDC(s) 50 may be moved through a volume of the leaching agent 16; for example, by moving a support 14' that carries the PDC(s) 50 through the volume of leaching agent 16. Movement of the PDC(s) 50 through a volume of leaching agent 16 may also cause circulation of the leaching agent 16.

As another option, leaching agent 16 may be directed under pressure onto surfaces of the PDC(s) 50. As shown in FIG. 1, leaching agent 16 may be ejected through one or more nozzles

18' or other orifices that direct a spray, a jet, or a curtain of the leaching agent 16 onto the surfaces of the PDC(s) 50.

In some embodiments, physical contact may be made with one or more surfaces of a PDC 50 during the leaching process. Such physical contact may resemble contact between a PDC cutting element and a wellbore surface during the drilling process and/or the contact between cuttings from the drilling process and the PDC cutting elements during drilling. Without limitation, such physical contact may be achieved by including a particulate and/or abrasive material in the leaching agent, by brushing, cleaning, deburring or polishing the at least one polycrystalline diamond compact surfaces of the PDC(s) 50 during the leaching process or in a variety of other ways.

As the surfaces of one or more PDCs are exposed to leaching agent, one or both of the leaching agent and the PDC(s) may be heated to an elevated temperature. While the elevated temperature is an above-ambient (e.g., room temperature, the current temperature in the environment where the leaching process is being conducted, etc.), it may, in some embodiments, resemble a temperature in a hot hole drilling environment. Some non-limiting examples of such a temperature are at least about 300° F. (about 150° C.), at least about 400° F. (about 205° C.), at least about 500° F. (about 260° C.) and at least about 400° C.

Leaching may be conducted under elevated pressure, or positive pressure (e.g., in an environment in which the pressure exceeds atmospheric pressure, in an environment in which the pressure exceeds the ambient pressure of the surrounding environment, etc.). In some embodiments, the pressure at which cobalt is leached from the PDC may resemble a pressure present in a hot hole drilling environment. Without limitation, a PDC and the leaching agent may be exposed to a pressure of about 10,000 psi (about 69 MPa) or greater, a pressure of about 20,000 psi (about 138 MPa) or greater or a pressure of about 35,000 psi (about 241 MPa) or greater during the leaching process.

In some embodiments, the leaching process, including the act of applying leaching agent to the surfaces of the polycrystalline diamond compact and, optionally, the act(s) of heating and/or pressurization, may continue for an extended period of time. The extended period of time may comprise a predetermined period of time. As a non-limiting example, the surfaces of a PDC may be exposed to leaching agent for twenty-four hours or more. Alternatively, the duration of exposure of the polycrystalline diamond compact to the leaching agent may be determined by monitoring the amount of cobalt removed from the polycrystalline diamond compact by the leaching agent. Upon determining that a sufficient amount of cobalt has been removed from the polycrystalline diamond compact, an appropriate time for removing the polycrystalline diamond compact from the leaching agent, or for removing the leaching agent from the polycrystalline diamond compact, may also be determined.

Figure 3:
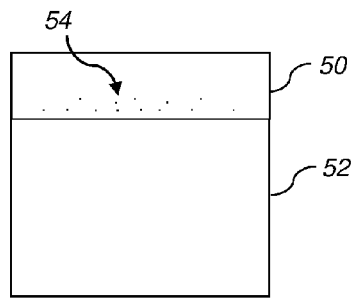
FIG. 3 illustrates an embodiment of a PDC from which cobalt or another diamond-diamond bonding catalyst has been substantially removed.

Turning now to FIG. 3, a leaching system (e.g., leaching system 10 of FIG. 1, leaching system 10' of FIG. 2, etc.), a leaching agent and/or a leaching process according to this disclosure may substantially remove a diamond-diamond bonding catalyst 54, such as cobalt, from the volume of a quantity of polycrystalline diamond, such as a PDC 50, even in embodiments where the polycrystalline diamond is carried by a substrate 52 that comprises a cemented carbide or any other material that would otherwise be dissolved, degraded or otherwise attacked during conventional leaching processes. The substantial removal of cobalt from the polycrystalline diamond may exceed a depth of 200 µm or more and, in some embodiments, may include the substantial removal of the diamond-diamond bonding catalyst 54 from the entire volume of the polycrystalline diamond, with only trace amounts of the diamond-diamond bonding catalyst 54 remaining at interior locations within the PDC 50. Notably, a structural integrity of the substrate 52 may be maintained or substantially maintained during substantial removal of the diamond-diamond bonding catalyst 54 from the polycrystalline diamond. Thus, the substrate 52 may have the same or substantially the same structural integrity as it had prior to removal of the diamond-diamond bonding catalyst 54 from the polycrystalline diamond.

Although the foregoing description sets forth many specifics, these should not be construed as limiting the scope of any of the claims, but merely as providing illustrations of some embodiments and variations of elements or features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. A system for removing cobalt from a polycrystalline diamond compact, comprising:
   a leaching agent resembling fluid present in a hot hole environment;
   a heating element for heating the leaching agent to a temperature resembling a temperature of fluid within the hot hole environment;
   a hot hole simulator in which heated leaching agent is applied to a polycrystalline diamond compact; and
   a sensor for monitoring an amount of cobalt that has been removed from the polycrystalline diamond compact by the heated leaching agent.

2. The system of claim 1, wherein the hot hole simulator is configured to cause the heated leaching agent to flow over surfaces of the polycrystalline diamond compact.

3. The system of claim 2, wherein the hot hole simulator contains a volume of the heated leaching agent and is configured to:
   cause the heated leaching agent to circulate; or
   cause the polycrystalline diamond compact to move through the volume of the heated leaching agent.

4. The system of claim 1, wherein the hot hole simulator is configured to physically impact a surface of the at least one polycrystalline diamond compact.

5. The system of claim 1, wherein the leaching agent comprises drilling fluid.

6. The system of claim 5, wherein the leaching agent further comprises at least one component present in a hot hole drilling environment.

7. The system of claim 6, wherein the leaching agent is formulated to remove cobalt from polycrystalline diamond without substantially dissolving, degrading or attacking a cemented carbide substrate supporting the polycrystalline diamond.

8. The system of claim 7, wherein the leaching agent lacks a hard mineral acid.

9. The system of claim 6, wherein the leaching agent comprises at least one of:
   a particulate material;
   an abrasive material;
   an oxidizing agent;
   an acid; and
   a base.

10. The system of claim 9, wherein the acid comprises a weak acid.

11. The system of claim 9, wherein the acid comprises citric acid.

12. A system for leaching cobalt from a polycrystalline diamond compact, comprising:
   a simulator for conditions mimicking a hot hole environment, the simulator configured to receive a leaching agent and the polycrystalline diamond compact and to heat and/or pressurize the leaching agent to expose the polycrystalline diamond compact to expose the polycrystalline diamond compact to the conditions mimicking the hot hole environment and to leach cobalt from the polycrystalline diamond compact; and
   a monitor for determining an amount of cobalt leached from the polycrystalline diamond compact while the simulator subjects the polycrystalline diamond compact to the conditions mimicking the hot hole environment.

13. The system of claim 12, wherein the simulator is configured to heat the leaching agent to a temperature of at least about 300° F., at least about 400° F., at least about 500° F. or at least about 400° C.

14. The system of claim 13, wherein the simulator is further configured to place the leaching agent and the polycrystalline diamond compact at an elevated pressure.

15. The system of claim 14, wherein the simulator is configured to place the leaching agent under a pressure of about 10,000 psi or greater, a pressure of about 20,000 psi or greater or a pressure of about 35,000 psi or greater.

16. The system of claim 12, wherein the simulator is configured to cause the leaching agent to flow over surfaces of the polycrystalline diamond compact.

17. The system of claim 16, wherein the simulator is configured to:
   direct the leaching agent onto the surfaces of the polycrystalline diamond compact;
   move the polycrystalline diamond compact through a volume of the leaching agent; and/or
   move the polycrystalline diamond compact through the volume of the leaching agent in a manner that simulates movement of a polycrystalline diamond compact on an earth boring drill bit.

18. The system of claim 12, wherein the simulator is further configured to physically impact a surface of the polycrystalline diamond compact while subjecting the polycrystalline diamond compact to the conditions mimicking the hot hole environment.

19. The system of claim 18, wherein the simulator is configured to:
   direct a leaching agent comprising at least one of a particulate material and an abrasive material toward the surface of the polycrystalline diamond compact;
   direct a particulate material onto the surface of the polycrystalline diamond compact;
   direct an abrasive material onto the surface of the polycrystalline diamond compact;
   clean the surface of the polycrystalline diamond compact;
   debur the surface of the polycrystalline diamond compact; and/or
   polish the surface of the polycrystalline diamond compact.

* * * * *